United States Patent
Swan et al.

(10) Patent No.: US 6,741,233 B1
(45) Date of Patent: May 25, 2004

(54) ROLLER FUNCTIONALITY IN JOYSTICK

(75) Inventors: Fred Swan, Castro Valley, CA (US); Aidan Kehoe, Fremont, CA (US); Thomas Burgel, Newark, CA (US); Roland Bosa, Fremont, CA (US); Paul Loughnane, Newark, CA (US); Urs Boesiger, Fremont, CA (US)

(73) Assignee: Logitech Europe S.A. (CH)

( * ) Notice: Subject to any disclaimer, the term of this patent is extended or adjusted under 35 U.S.C. 154(b) by 0 days.

(21) Appl. No.: 09/560,554

(22) Filed: Apr. 28, 2000

(51) Int. Cl.[7] ............................................... G09G 5/00
(52) U.S. Cl. ......................................... 345/161; 345/156
(58) Field of Search ................................ 345/156, 157, 345/158, 159, 161, 164; 463/36, 37, 38

(56) References Cited

U.S. PATENT DOCUMENTS

| | | | | |
|---|---|---|---|---|
| 5,113,179 A | * | 5/1992 | Scott-Jackson et al. | 200/6 A |
| RE34,931 E | * | 5/1995 | Duchon | 250/221 |
| 5,694,153 A | * | 12/1997 | Aoyagi et al. | 345/161 |
| 5,973,471 A | * | 10/1999 | Miura et al. | 318/590 |
| 6,072,471 A | * | 6/2000 | Lo | 345/163 |
| 6,154,199 A | * | 11/2000 | Butler | 345/167 |
| 6,164,808 A | * | 12/2000 | Shibata et al. | 700/85 |
| 6,200,219 B1 | * | 3/2001 | Rudell et al. | 463/37 |
| 6,244,959 B1 | * | 6/2001 | Miyamoto et al. | 345/419 |
| 6,262,712 B1 | * | 7/2001 | Osborne et al. | 345/156 |
| 6,304,247 B1 | * | 10/2001 | Black | 345/157 |
| 6,310,607 B1 | * | 10/2001 | Amemiya | 345/159 |
| 6,314,426 B1 | * | 11/2001 | Martin et al. | 345/156 |
| 6,317,119 B1 | * | 11/2001 | Wakeland et al. | 345/156 |
| 6,332,840 B1 | * | 12/2001 | Nishiumi et al. | 345/161 |
| 6,342,879 B1 | * | 1/2002 | Hantom | 345/161 |
| 6,353,429 B1 | * | 3/2002 | Long | 345/158 |
| 6,353,431 B1 | * | 3/2002 | Poole et al. | 345/161 |

* cited by examiner

*Primary Examiner*—Vijay Shankar
*Assistant Examiner*—Nitin Patel
(74) *Attorney, Agent, or Firm*—Townsend and Townsend and Crew LLP

(57) ABSTRACT

A roller is provided in an input device such as a joystick to perform functions that compliment its operation. Upon detecting rotational movement of the roller in a first direction by a preset angle, a first signal is generated for activating a first logical button. Upon detecting rotational movement of the roller in a second direction by a preset angle, a second signal is generated for activating a second logical button. Roller rotation by multiples of the preset angle represents a series of button presses. The button press may be assigned a function such as selecting an item from a menu or adjusting attributes of objects or data displayed on a computer screen, such as the selection or firing of weapons or adjustment of shield balance in a video game application.

20 Claims, 5 Drawing Sheets

ROLLER FUNCTIONALITY IN JOYSTICK

BACKGROUND OF THE INVENTION

The present invention relates to pointing devices and, more particularly, to a pointing device such as a joystick including a roller.

Some mouse devices include a roller for such functions as controlling cursor movement along a third axis, scrolling, or zooming. The roller is operated by a user finger much like a dial on a radio. For instance, U.S. Pat. No. 5,473,344 shows a user operable roller which includes a shaft extending to an optical encoder wheel. U.S. Pat. No. 5,530,455 discloses a roller having a shaft which drives a belt connected to a pulley on a separate encoder. Heretofore, the roller has been used in mouse devices or the like for functions such as cursor movement, scrolling, and zooming that compliment the operation of such devices in particular applications.

SUMMARY OF THE INVENTION

The present invention provides a roller in pointing devices such as joysticks, game pads, or steering wheels, performing functions that compliment the operation of those devices. For example, the roller rotation by a preset angle may be interpreted as a button press, and roller rotation by multiples of the preset angle represents a series of button presses. The button press may be assigned a function such as selecting an item from a menu or adjusting attributes of objects or data displayed on a computer screen, such as the selection or firing of weapons or adjustment of shield balance in a video game application. Instead of button presses, the roller rotation may, by way of example, generate a stream of relative axis displacement data having preassigned functions associated therewith.

In accordance with an aspect of the invention, a method of operating an input device having a roller comprises detecting rotational movement of the roller, and generating a first signal in response to the rotational movement of the roller in a first direction. In response to the first signal, a first button is activated.

In specific embodiments, the first signal is a first button "on" signal including a first button "on" state for a preset duration followed by a first button "off" state. The first button "on" signal is generated for a preset amount of rotational movement of the roller in the first direction. A series of first button "on" signals are generated in response to rotational movement in the first direction of the roller of multiples of the preset amount each corresponding to a single first button "on" signal. A first function is assigned to the first button "on" signal, and the series of first button "on" signals represent repeating the first function by the same multiples. The first button may activate a first preassigned function of sequentially selecting a next item in a first menu of items in response to the first signal.

In accordance with another aspect of the invention, a method of operating an input device having a roller comprises detecting rotational movement of the roller measured in discrete rotational steps, and generating a signal in response to the rotational movement of the roller. The first signal includes relative displacement data comprising a number of rotational steps per a preset time interval. A preassigned function is activated in response to the signal. In specific embodiments, the preassigned function varies with the number of rotational steps per the preset time interval, and may also vary with the direction of rotation of the roller.

DESCRIPTION OF THE SPECIFIC EMBODIMENTS

Figure 1:
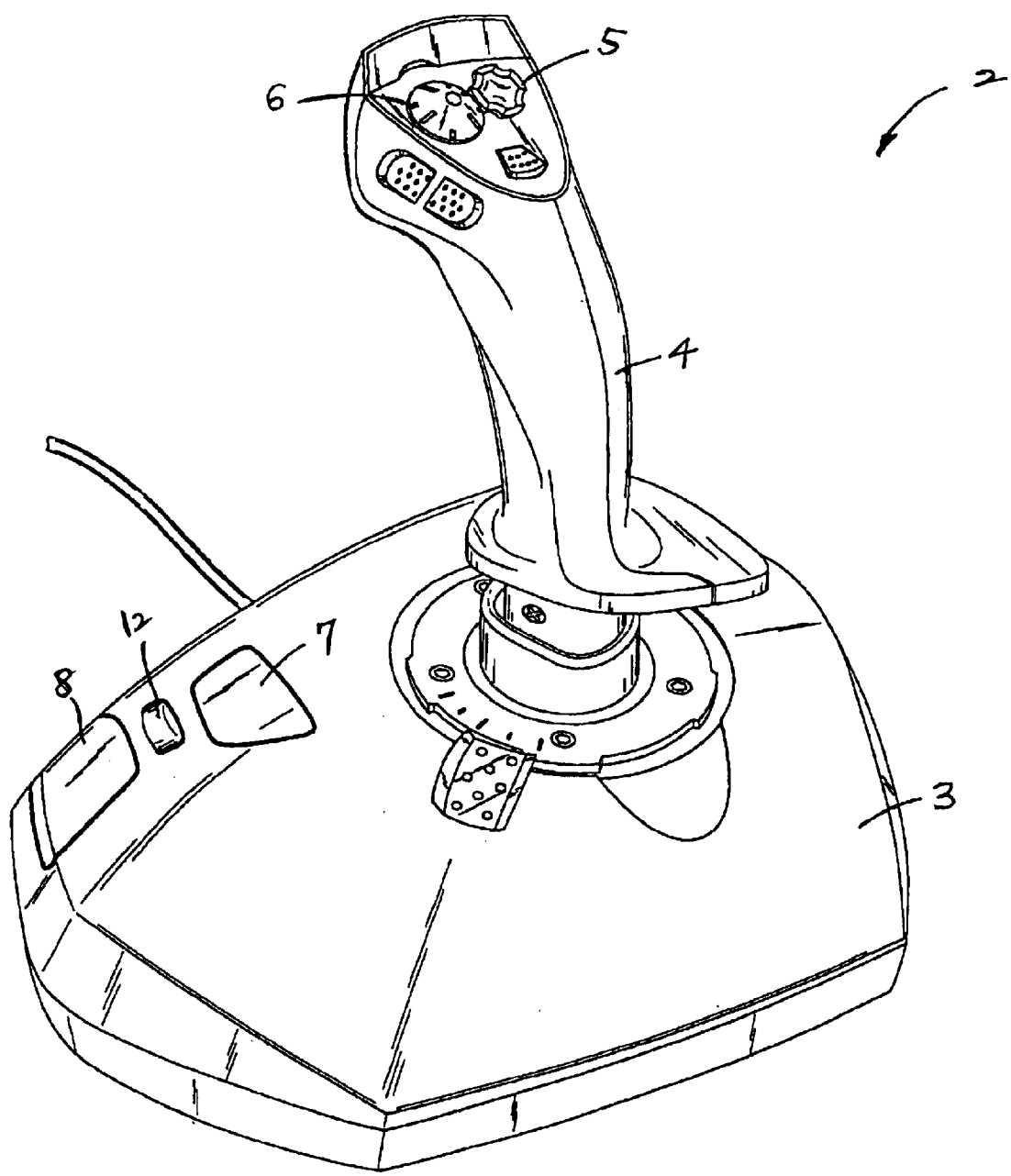
FIG. 1 is a perspective view of a joystick device having a roller according to an embodiment of the present invention.

FIG. 1 shows a joystick device 2 having a housing 3 and a user-manipulable joystick 4 movably supported thereon. The joystick 4 is typically supported on a gimbal mechanism, and position sensors or transducers such as a pair of potentiometers are provided for detecting movement of the joystick 4 in the front-back or Y direction and the left-right or X direction. The joystick device 2 includes additional input members. For instance, disposed at the top of the joystick 4 are a control pad 5 and a dial 6. Additional buttons 7, 8 are provided on the housing 3. Also extending through a slot of the housing 3 is a roller 12.

Figure 2:
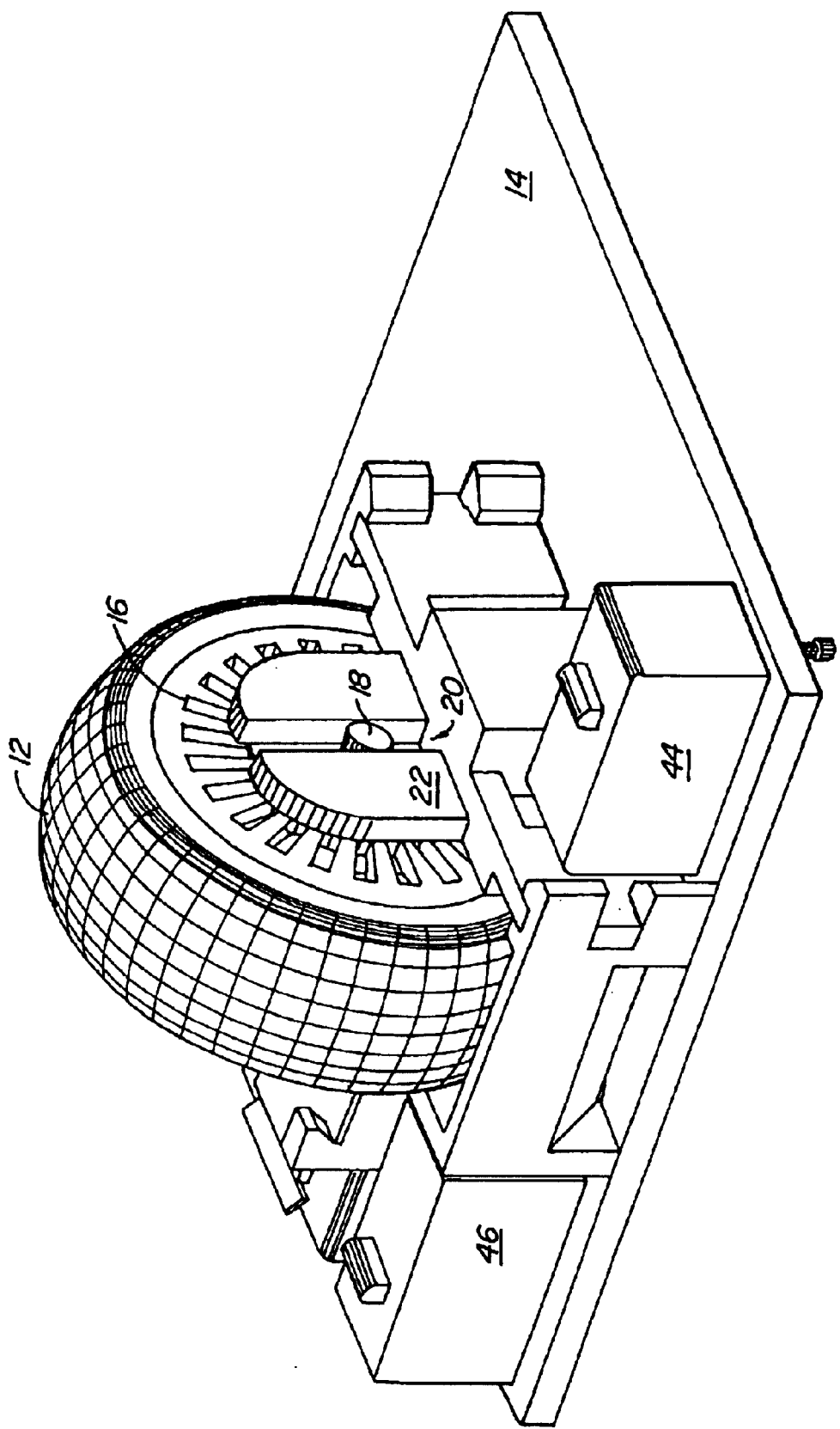
FIG. 2 is a perspective view of the roller according to one preferred embodiment of the invention.

FIG. 2 illustrates a roller 12 mounted over a substrate 14 which is mounted inside the joystick housing 3, with the roller 12 extending out through a slot in the housing 3 for user actuation. The roller 12 has a number of slits 16 that are elongated and extend radially from the center. An emitter and a detector are used to detect rotation of the roller 12 by monitoring light transmitted from the emitter to the detector through the slots 16, as described below. The number of slits 16 can vary from six to forty-eight or even more. In a preferred embodiment, the number of slits 16 is ¼ the number of ratchets of the roller 12, or a multiple thereof. The ratchets are generated by a ratchet producing mechanism as described below. By incorporating the slits 16 into the roller body itself, the need for a coupling mechanism to a separate encoder wheel is eliminated.

The roller 12 can move up and down in translation. The roller 12 rotates about an inner roller or ring (not shown in FIG. 2) which rotates about an axle 18. The axle 18 is mounted in a slot 20 in a support structure 22. By aligning the emitter and detector along the vertical axis even with the slot 20, the up and down movement of the roller will not affect the detection of the rotational movement.

Figure 3:
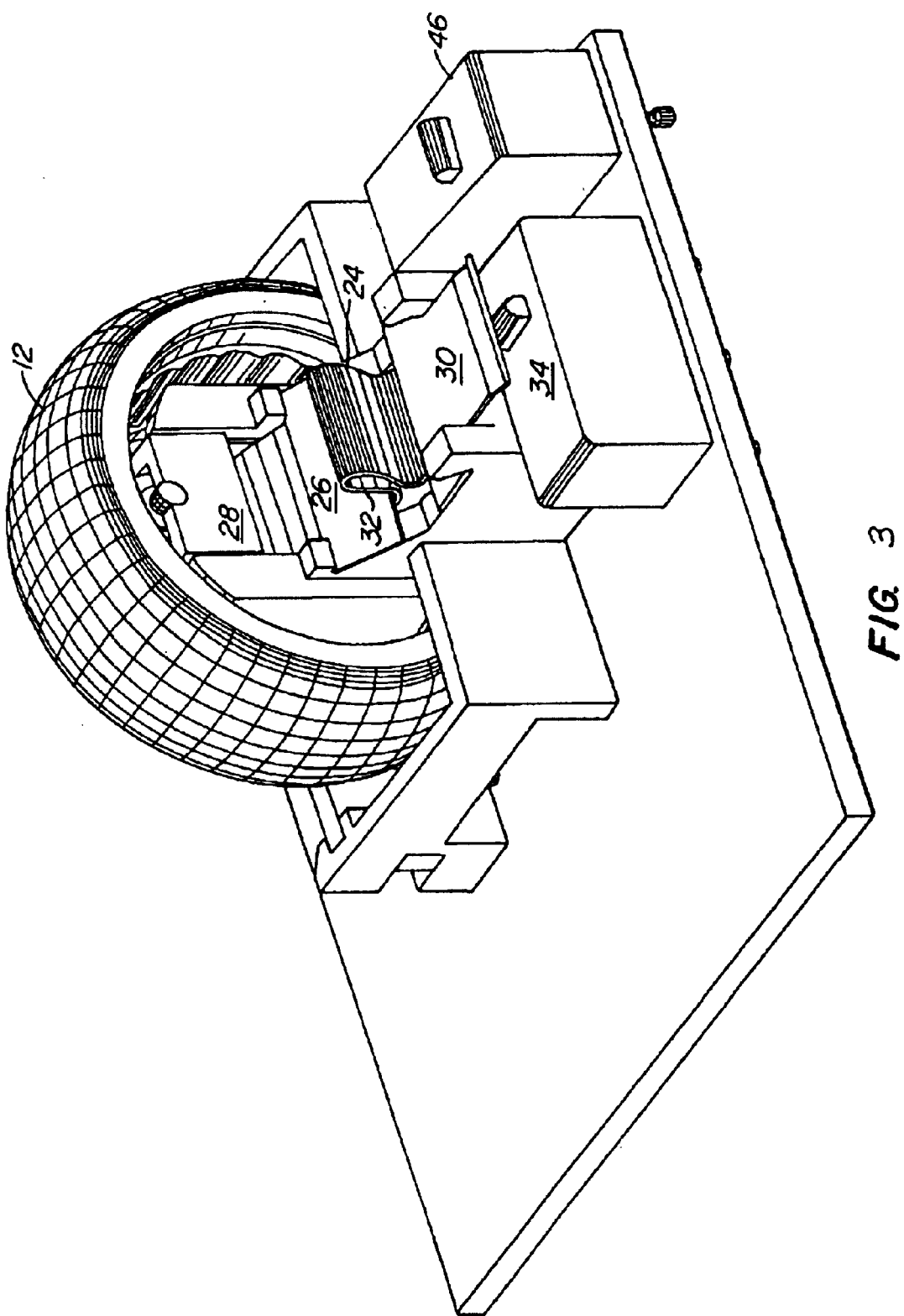
FIG. 3 is a perspective view of the opposite side of the roller of FIG. 2.

FIG. 3 shows the opposite side of the roller 12 which is open. An internal mechanism produces a ratchet effect, discussed below, as well as an attachment to a spring 24. The spring 24 connects with a first, flat portion 26 to an internal support structure 28 for the roller 12. The spring 24 includes an additional flat portion 30 over a microswitch 34, with the flat portions 26, 30 being joined by a curved or loop portion 32. The flat portions 26, 30 are rigid. When the roller 12 is depressed, the flat portion 30 will contact the microswitch 34, providing an activating signal. In an alternate embodiment, an optical switch may be used to detect the depression of the roller 12, with an emitter and detector positioned below the roller 12 normally, so that they have the light path blocked when the roller 12 is depressed.

Alternatively, the light beam may be interrupted by the spring or a lever, or reflective detection may be used.

Figure 4:
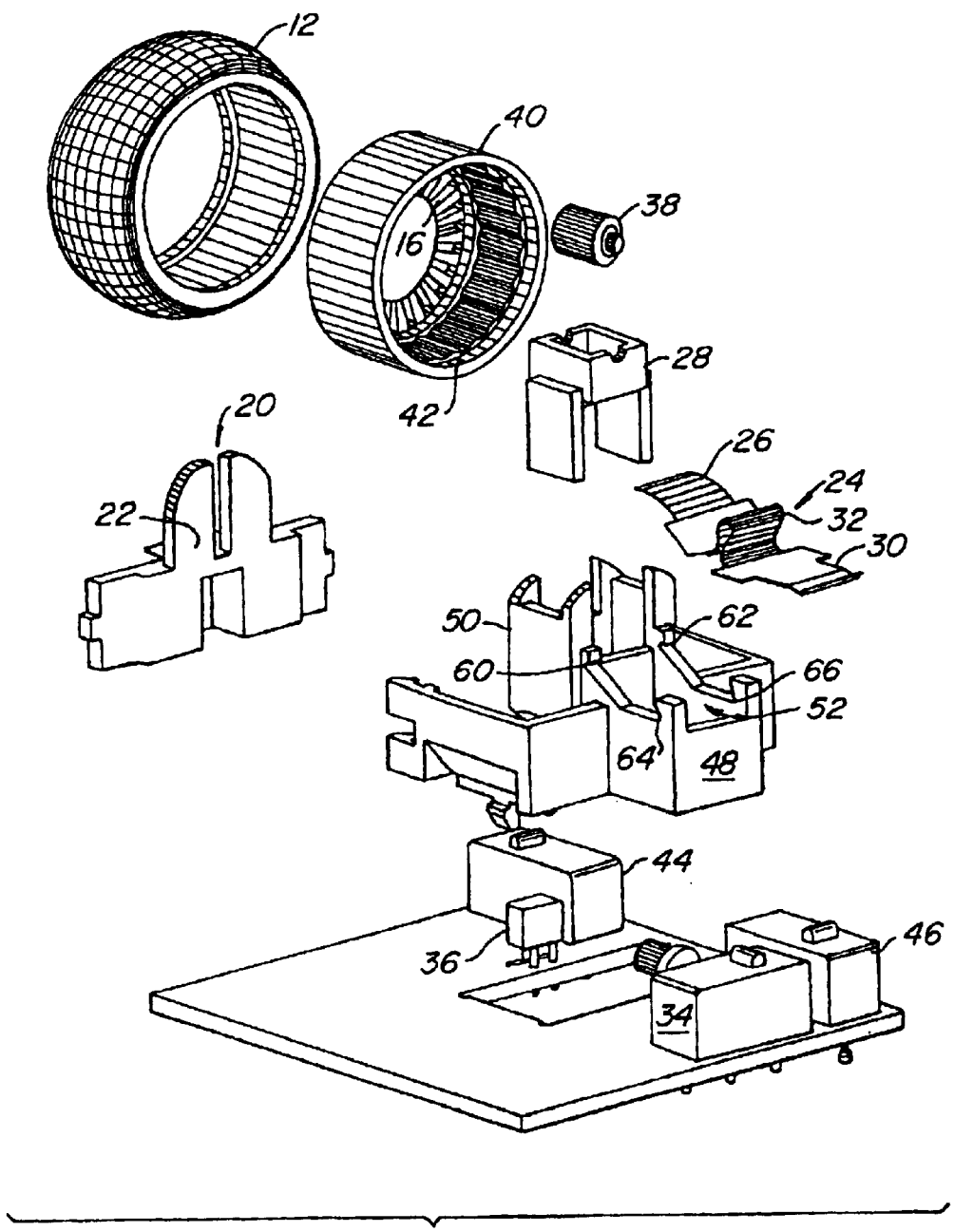
FIG. 4 is an exploded perspective view of the roller of FIG. 3.

As shown in the exploded view of FIG. 4, an optical detector 36 is mounted along the vertical axis of the roller 12, with a corresponding photoemitter or LED 35 on the other side. Alternately, the position of the emitter and detector may be reversed, but preferably the detector 36 is adjacent the slots 16 so that light does not diverge as much after passing through the slots 16, allowing more accurate measurement.

Also shown more clearly in FIG. 4 is the support structure 28 which holds a second, smaller roller 38. A ring 40 is mounted inside the roller 12 in a press fit configuration. The ring 40 is the portion including the slots 16 on one end. In addition, the ring 40 includes an undulating or sawtooth-type inner surface 42. The small roller 38 is biased against this undulating surface by the action of the spring 24 pushing up against the bottom of the support structure 28 of the small roller 38. Further, this mechanism is the actual support for the small roller 38, which is pushed up against the main skeleton, portion 50, and extends through a slot in the joystick housing 3. Thus, when the user moves the roller 12, the user feels a spring-back or ratchet-type resistance due to the spring action of the small roller 38, giving it the feel of a mechanical, ratchet encoder wheel, while it actually uses optical encoding for recording its position. The use of the small roller 38 improves the durability of the mechanism compared to prior designs that simply spring bias an element against a sawtooth surface.

Moreover, the spring 24 is configured so that the same spring not only provides the upward support for the roller 12, but when the roller 12 is depressed, will press downward to activate the microswitch 34. This is possible through the unique use of the flat portions 26, 30 of the spring 24 connected by the loop portion 32. The loop portion 32 is under stress, having been compressed upon assembly. The loop portion 32 generates a downward force on the flat portion 26 to cause the flat portion 30 to also go down, rather than up. This allows an easy mounting of the microswitch 34 underneath the flat portion 30, with it being actuated when the roller 12 is depressed. The flat portion 26 pivots about a pivot point at notches 60, 62. Similarly, the flat portion 30 pivots about a pivot point where it contacts notches 64, 66. In operation, the flat portion 26 will pivot upward at the end attached to the loop portion 32, which will move that end of the flat portion 30 up, causing the far end over the microswitch 34 to pivot down. FIG. 4 also shows microswitches 44, 46 for the buttons 7, 8 disposed on opposite sides of the roller 12 (FIG. 1) to provide the standard clicking functions for the joystick device 2.

Note that the specific embodiment of the roller 12 shown and described is merely for illustrative purposes. Other rollers having different configurations and structures, including those having an encoder separate and spaced from the roller and those employing a different encoder such as a mechanical encoder, may be used with the joystick device 2.

Figure 5:
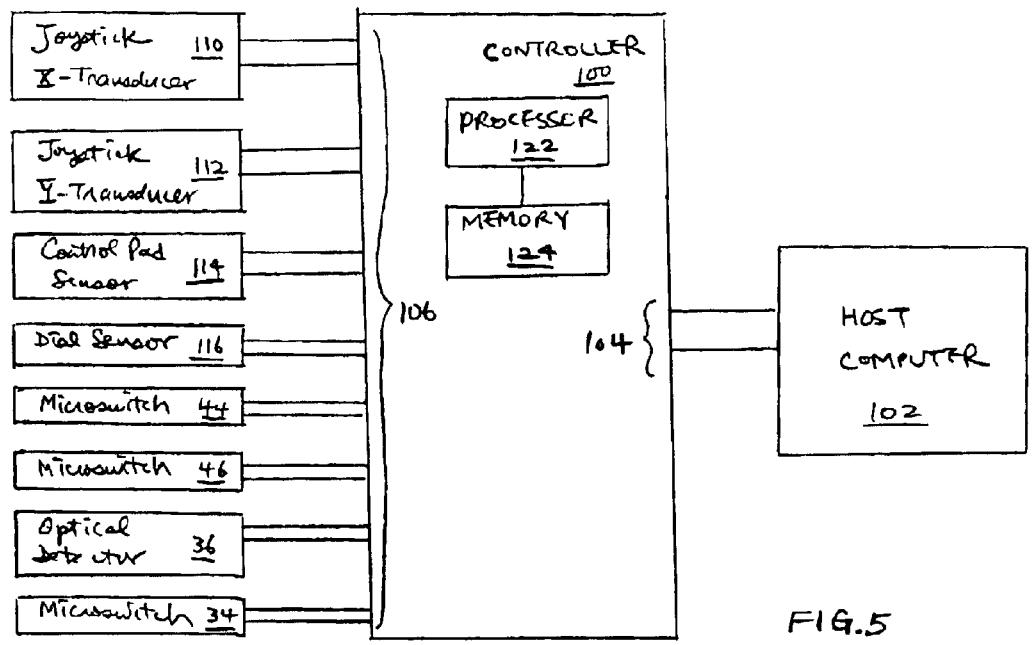
FIG. 5 is a block diagram of the joystick device of FIG. 1.

FIG. 5 shows a block diagram illustrating the controller 100 of the joystick 2 communicating with the host computer 102 via serial ports 104, through which the joystick 2 may obtain power from the host computer 102. The controller 100 receives input from the various input members of the joystick device 2 via a plurality of input lines 106. As shown in FIG. 5, the input members include joystick X-transducer 110 and Y-transducer 112 for sensing left-right and front-back movements of the joystick 2, respectively, control pad sensor 114 for detecting movement of the control pad 5, dial sensor 116 for sensing movement of the dial 6, microswitches 44, 46 for sensing clicking of the buttons 7, 8, roller optical detector 36 for detecting rotation of the roller 12, and roller microswitch 34 for detecting translation of the roller 12. Of course, more or fewer input members may be provided in other embodiments.

The controller 100 includes a processor 122 and a memory 124. The processor 122 typically includes analog and digital input/output boards, interface boards, and/or various controller boards. The memory 124 may be a disk drive or other computer-readable medium. The controller 100 receives various position and actuation data from the input members, and processes the data and transfers the data to the host computer 102 by executing software or firmware in the form of a computer program stored in a computer-readable medium such as the memory 124. The computer program includes sets of instructions that dictate the processing of the input data. The computer program code can be written in any known computer readable programming language.

Figure 6:
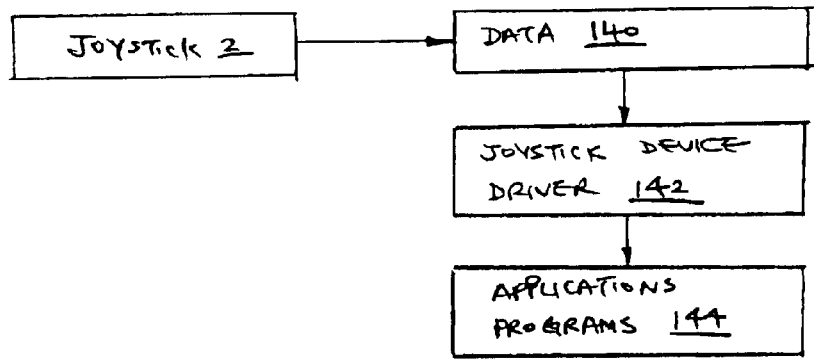
FIG. 6 is a flow diagram illustrating the operation of the joystick device with roller of FIG. 1.

As shown in the flow diagram of FIG. 6, the joystick device 2 generates input data 140 and sends the data 140 to a host or joystick device driver program 142. The host driver program 142 interprets the data and sends the data to applications programs 144 which may typically be stored in the host computer 102. For instance, the driver program 142 may translate certain position data into virtual screen definitions to maintain a virtual screen, and may calculate the current cursor position within the virtual screen and maintain presentation and movement of the cursor.

Figure 7:
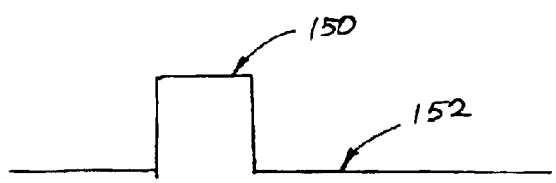
FIG. 7 is a schematic diagram of a button "on" signal.

In a specific embodiment, the driver program 142 interprets rotational movement of the roller 12 as logical button presses. For example, rotation of the roller 12 in a first direction produces a first input signal which is interpreted as a button press for activating a first logical button. The first input signal is a button "on" signal including a button "on" state 150 for a preset duration followed by a button "off" state 152, as illustrated in FIG. 7. The duration of the button "on" state may be set at any desired level, such as about 50 ms. The button press of the first logical button may operate as any other button press such as those for the buttons 7, 8 on the joystick device 2.

The button "on" signal is generated for a preset amount of rotational movement, which may be measured by the number of ratchets or roller counts. When the roller is moved in multiples of the preset amount of rotational movement, a series of button "on" signals are generated. This functionality allows the generation of multiple sequential quick and precise button presses and releases by rotating the roller.

Rotation of the roller 12 in a second direction opposite from the first direction may be interpreted as a button press for activating a second logical button by generating a second button "on" signal.

The application program 144 (FIG. 6) sees the button "on" signals generated by rotation of the roller 12 and reacts according to the specific functions assigned thereto. For example, each first button "on" signal may represent selecting a next item in a first menu of items or adjusting attributes of objects or data displayed on a computer screen, such as the selection of weapons or adjustment of shield balance in a video game application. Rotation of the roller in the opposite direction may represent selecting a next item in a second menu of items or selecting a next item in the first menu in reverse order. This is different from the case where roller rotation scrolls through a menu and depression of the roller 12 is required to select an item from the menu by activating the microswitch 34 (FIG. 4). In another example, each button "on" signal generated by the roller rotation may represent firing a weapon or incrementally increasing or decreasing shield level.

In another specific embodiment, the drive program 142 receives data produced by rotational movement of the roller 12 in the form of a relative axis displacement report. For instance, moving the roller 12 slowly forward by a rotational step such as one notch or ratchet gives a displacement of +1. Moving the roller 12 quickly forward by several ratchets produces a stream of displacements of +1 up to a maximum value of, e.g., +5 where the magnitude increases with speed. The report is taken once per a preset time interval of, e.g., 10 ms. The displacement value is typically equal to the number of ratchets per time interval. The displacement report includes relative data because the displacement is measured from the last reported time. In a typical example, the stream of displacement reports may include +1, +3, +5, +3, +1, as the roller increases in speed and then decreases in speed in rotation over several ratchets. Similarly, moving the roller 12 slowly backward by one ratchet may give a displacement of +1, and moving it quickly backward by several ratchets may give a stream of displacements of +1 up to +5 and down. Alternatively, the change in direction from forward to backward rotation may be represented by negative displacement data of −1 per ratchet up to −5 for 5 ratchets within the preset time interval. The application program 144 may use the displacement data for moving a character in a video game, adjust the value of an attribute in a game, or the like.

The above-described arrangements of apparatus and methods are merely illustrative of applications of the principles of this invention and many other embodiments and modifications may be made without departing from the spirit and scope of the invention as defined in the claims. For instance, the roller functionality may be implemented in other input devices such as game pads and steering wheels. Other specific functions may be assigned to the roller movements as desired and presented to the application programs. The scope of the invention should, therefore, be determined not with reference to the above description, but instead should be determined with reference to the appended claims along with their full scope of equivalents.

What is claimed is:

1. A method of operating an input device having a roller, the method comprising:

detecting rotational movement of the roller exposed for contact and movement by a user's hand;

generating a first signal in response to the rotational movement of the roller in a first direction; and activating a first button in response to the first signal, wherein first signal is a first button "on" signal including a first button "on" state for a preset duration followed by a first button "off" state, and wherein the first button "on" signal is generated for a preset amount of rotational movement of the roller in the first direction.

2. The method of claim 1 wherein a series of first button "on" signals are generated in response to rotational movement in the first direction of the roller of multiples of the preset amount each corresponding to a single first button "on" signal.

3. The method of claim 2 wherein a first function is assigned to the first button "on" signal, and wherein the series of first button "on" signals represent repeating the first function by the same multiples.

4. A method of operating an input device having a roller, the method comprising:

detecting rotational movement of the roller exposed for contact and movement by a user's hand;

generating a first signal in response to the rotational movement of the roller in a first direction;

activating a first button in response to the first signal;

generating a second signal in response to the rotational movement of the roller in a second direction opposite from the first direction; and activating a second button in response to the second signal.

5. A method of operating an input device having a roller, the method comprising:

detecting rotational movement of the roller exposed for contact and movement by a user's hand;

generating a first signal in response to the rotational movement of the roller in a first direction;

activating a first button in response to the first signal;

detecting translational movement of the roller;

generating a third signal in response to the translational movement of the roller; and activating a third button in response to the third signal.

6. A method of operating an input device having a roller, the method comprising:

detecting rotational movement of the roller exposed for contact and movement by a user's hand;

generating a first signal in response to the rotational movement of the roller in a first direction; and activating a first button in response to the first signal, wherein activating the first button activates a first preassigned function of sequentially selecting a next item in a first menu of items in response to the first signal.

7. The method of claim 6 further comprising:

generating a second signal in response to the rotational movement of the roller in a second direction opposite from the first direction; and activating a second preassigned function in response to the second signal, the second preassigned function comprising sequentially selecting a next item in the first menu of items in reverse order.

8. A method of operating an input device having a roller, the method comprising:

detecting rotational movement of the roller exposed for contact and movement by a user's hand;

generating a first signal in response to the rotational movement of the roller in a first direction;

activating a first button in response to the first signal;

generating a second signal in response to the rotational movement of the roller in a second direction opposite from the first direction; and activating a second preassigned function in response to the second signal, the second preassigned function comprising sequentially selecting a next item in a second menu of items.

9. A pointing device comprising:

a housing;

a user-movable roller extend from the housing and exposed for contact and movement by a user's hand;

a first sensor coupled with the user-movable roller for detecting movement thereof;

a first button;

a controller configured to receive and process input signals generated by movement of the user-movable roller; and a memory, coupled to the controller, comprising a computer-readable medium having a computer-readable program embodied therein for processing the input signals, the computer-readable program including:
- a first set of computer instructions for generating a first signal in response to rotational movement of the roller in a first direction detected by the first sensor; and
- a second set of computer instructions for activating the first button in response to the first signal.

10. The pointing device of claim 9 wherein the first set of computer instructions is configured to generate a first button "on" signal including a first button "on" state for a preset duration followed by a first button "off" state, and wherein the first button "on" signal is generated for a preset amount of rotational movement of the roller in the first direction.

11. The pointing device of claim 10 wherein the first set of computer instructions is configured to generate a series of first button "on" signals in response to rotational movement in the first direction of the roller of multiples of the preset amount each corresponding to a single first button "on" signal.

12. The pointing device of claim 11 wherein a first function is assigned to the first button "on" signal, and wherein the series of first button "on" signals represent repeating the first function by the same multiples.

13. The pointing device of claim 9 further comprising a second button, and wherein the computer-readable program further includes:
- a third set of computer instructions for generating a second signal in response to the rotational movement of the roller in a second direction opposite from the first direction; and
- a fourth set of computer instructions for activating the second button in response to the second signal.

14. The pointing device of claim 9 further comprising a third button, and wherein the computer-readable program further includes:
- a fifth set of computer instructions for generating a third signal in response to translational movement of the roller detected by the first sensor; and
- an sixth set of computer instructions for activating the third button in response to the third signal.

15. The pointing device of claim 9 wherein the second set of computer instructions is configured to activate the first button in response to the first signal to sequentially select a next item in a first menu of items.

16. The pointing device of claim 9 further comprising a user-manipulable joystick supported on the housing.

17. The pointing device of claim 9 wherein activating the first button activates a first preassigned function which varies with the number of rotational steps per a preset time interval.

18. A method of operating an input device having a roller, the method comprising:
- detecting rotational movement of the roller exposed for contact and movement by a user's hand;
- generating a first signal in response to the rotational movement of the roller in a first direction; and
- automatically activating a first button in response to the first signal;
- wherein activating the first button activates a first preassigned function which varies with the number of rotational steps per a preset time interval.

19. The method of claim 18 further comprising:
- generating a second signal in response to the rotational movement of the roller in a second direction opposite from the first direction; and
- automatically activating a second button in response to the second signal.

20. A method of operating an input device having a roller, the method comprising:
- detecting rotational movement of the roller exposed for contact and movement by a user's hand;
- generating a first signal in response to the rotational movement of the roller in a first direction; and
- automatically activating a first button in response to the first signal;
- wherein activating the first button activates a first preassigned function which varies with the direction of rotation of the roller.

* * * * *